United States Patent [19]

Boudin et al.

[11] 4,400,881
[45] Aug. 30, 1983

[54] APPARATUS FOR LOCATING THE LEVEL OF LIQUID IN A VESSEL

[75] Inventors: Daniel Boudin, Orleans; Jean Godat, Olivet; Alain Krzywdziak, Saint Denis en Val; Daniel Parmenon, Orleans la Source, all of France

[73] Assignee: Fonderie et Ateliers des Sablons, Orleans, France

[21] Appl. No.: 230,044

[22] Filed: Jan. 29, 1981

[30] Foreign Application Priority Data

Feb. 19, 1980 [FR] France .............................. 80 03569

[51] Int. Cl.³ .......................................... G01F 23/04
[52] U.S. Cl. .................................. 33/126.7 A; 73/322
[58] Field of Search ..................... 33/126.7 A; 73/322

[56] References Cited

U.S. PATENT DOCUMENTS

| | | | |
|---|---|---|---|
| 2,354,259 | 7/1944 | Grubelic | 33/126.7 A |
| 2,537,277 | 1/1951 | O'Neill | 73/322 |
| 2,561,525 | 7/1951 | McCauley | 33/126.7 A |
| 2,563,601 | 8/1951 | Grubelic | 33/126.7 A |
| 2,685,135 | 8/1954 | Grubelic | 33/126.7 A |
| 2,844,875 | 7/1958 | Grubelic | 33/126.7 A |
| 3,274,690 | 9/1966 | Beverly, Jr. | 33/126.7 A |
| 3,530,590 | 9/1970 | Dunham et al. | 33/126.7 A |
| 3,676,932 | 7/1972 | Druet | 33/126.7 A |
| 4,059,904 | 11/1977 | Sato | 33/126.7 A |

FOREIGN PATENT DOCUMENTS 675267  5/1966  Belgium ......................... 33/126.7 A Primary Examiner—Herbert Goldstein
Assistant Examiner—Joseph W. Roskos
Attorney, Agent, or Firm—Scully, Scott, Murphy & Presser

[57] ABSTRACT

An apparatus is provided for locating the level of liquids for particular use in volumetric dosage techniques. A probe is mounted upon a vertical column which slides axially in a slide fixed in the housing of the apparatus. Adjacent to the slide is a threaded rod rotatably mounted in the housing and a releasable nut which is integral with the vertical column and the threaded rod. The releasable nut permits engagement and disengagement of the vertical column and threaded rod. A drive mechanism connected to the vertical column is employed to control a potentiometer as a function of the position of the vertical column.

10 Claims, 10 Drawing Figures

APPARATUS FOR LOCATING THE LEVEL OF LIQUID IN A VESSEL

BACKGROUND OF THE INVENTION

1. Field of the Invention

The present invention relates to apparatus for locating the level of liquid which can be used, but not exclusively, in apparatus for dividing into equal parts a segment of variable length by a divisor number which can be any whole number.

The apparatus is especially applicable to the quantitative dosage of liquid products and particularly to the production of paint mixtures in which the different constituents are proportioned in mixing parts.

2. Description of the Prior Art

It is known that such a level locating apparatus usually comprises a vertically moveable probe and whose position in relation to a fixed point such as, for example, the bottom of a vessel, is plotted by means of two transducers, namely, a transducer which is used to control the amplification of the apparatus, that is, the length of the segment to be divided which is concretized by the maximum difference between the fixed point and the probe, and a transducer to measure the movement between the fixed point and the probe when this latter moves in the interval of the segment.

With the help of information delivered by these two transducers it is possible, with the help of a device of the type described in FR Patent Application No. 77 39 839, to divide the segment into equal parts by any whole divisor and to successively display, when the probe moves in relation to the fixed point, the successive divisions with their numeration in parts.

SUMMARY OF THE INVENTION

In the application of the apparatus of the present invention to the volumetric dosage of parts of liquids, the segment of variable length is determined by the distance which separates the tip of the probe and the bottom of the dosage vessel.

Therefore, to carry out a dosage with the help of a device for dividing into equal parts a segment of variable length of the type previously mentioned, first the length of the segment to be divided is displayed, that is, the total desired height of liquid to be prepared, for example, 130 mm per 1000 divisions of the counter or 195 mm per 1,500 divisions, with the same amplification.

In moving the probe from the bottom of the dosage vessel to the total height of liquid to be prepared, the display will indicate the successive fractions, from 0 to 1000 (and even beyond, in case of supplementary thousandths to be added).

The invention has more particularly for its purpose, to provide a level locating device of great accuracy and easy to operate so that it can be used by workers unfamiliar with dosage techniques, for example, by automobile body workers.

To achieve this purpose, the locating device according to the invention comprises:

a probe bearing at its lower end a level detector and which is mounted with the possibility of height adjustment upon a support element integral with a vertical column sliding axially in a slide fixed in the body of the device;

a vertical threaded rod rotatably mounted in said body near said column and capable of being driven in rotation by means of a manually controlled drive device;

a releasable nut axially integral with said column and which, by the action of a control device, can take two postions namely:

an engaged position in which the threads of the nut work together with the threading of the threaded rod so as to obtain an axial movement of the column at the time of the threaded rod's rotation, a disengaged position in which the threads of the nut are moved away from the threading of the threaded rod, this disengaged position allowing a free sliding action of the column in its slide; and, a drice device providing the control of a potentiometer according to the position of said column.

According to one embodiment of the invention, said drive device consists of a positive acting mechanical system such as a notched belt or endless chain extending parallel to said column and mounted on two running-wheels of which one drives the potentiometer, said belt or said chain being driven by said column by means of a connecting member.

As far as the level detector is concerned, it can consist of a blade comprising, on its lower edge, a protuberance which is designed so as to cause, when it comes into contact with the liquid, a capillary pre-flash, and, an inclined element bearing a guide mark indicating the moment when the liquid reaches the final level.

BRIEF DESCRIPTION OF THE DRAWINGS

Some embodiments of the invention will be described hereafter, in the way of non-limiting examples, referring to the attached drawings in which.

DESCRIPTION OF THE PREFERRED EMBODIMENTS

Figure 1:
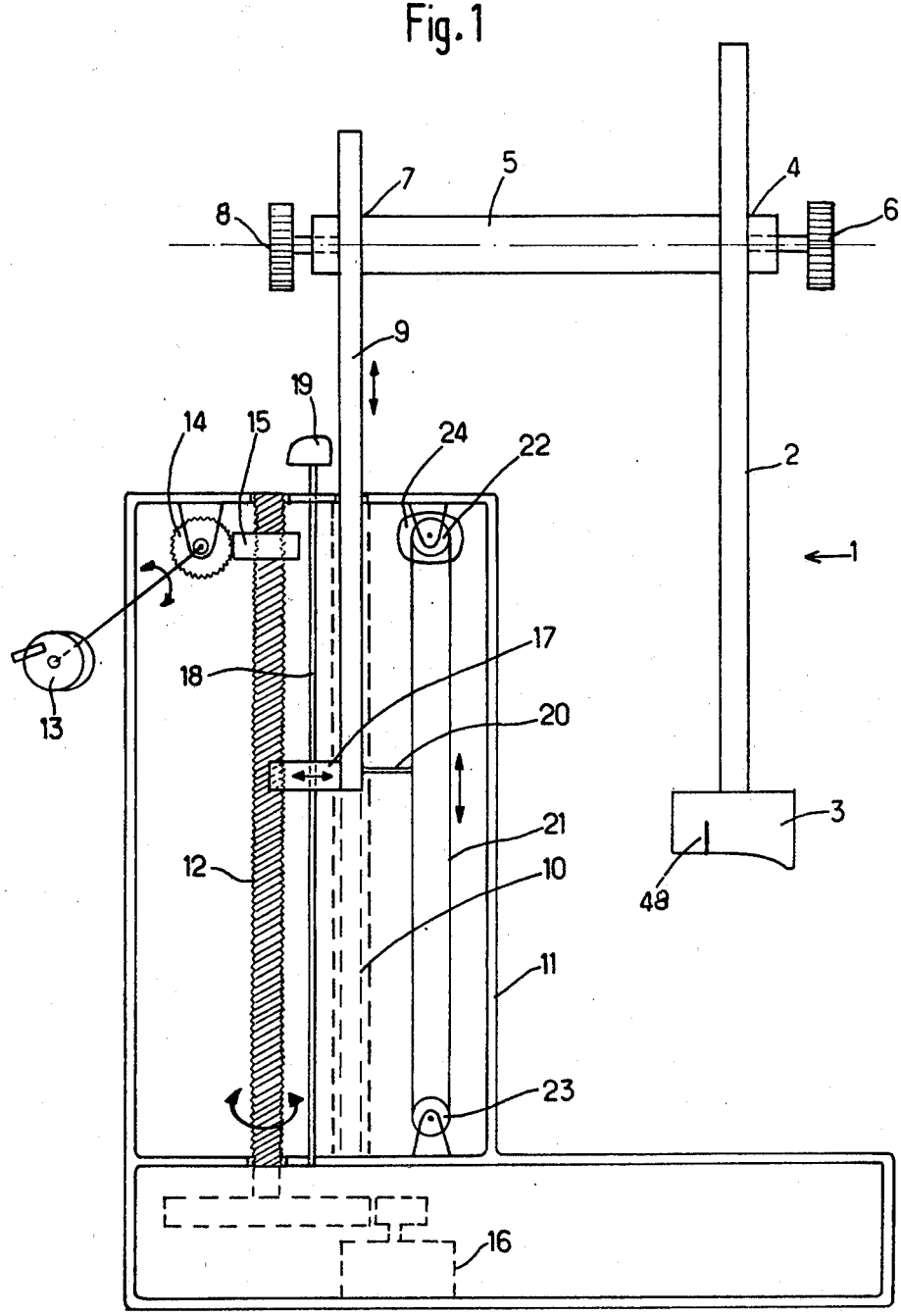
FIG. 1 is a schematic section illustrating the principle of operation of the level locating apparatus according to the invention.
Figure 2:
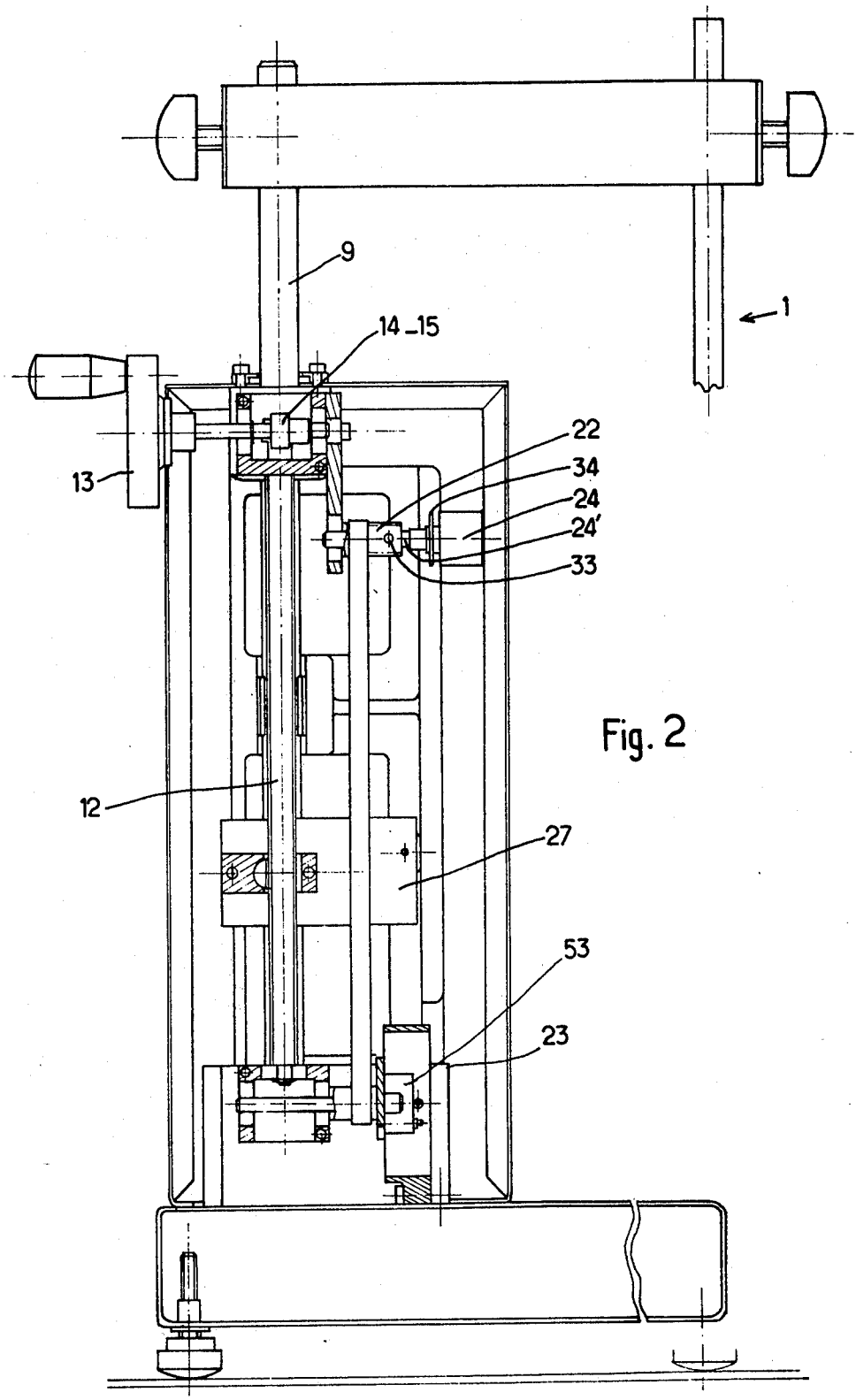
FIGS. 2 and 3 illustrate the apparatus respectively in vertical longitudinal section (FIG. 2) and cross-section (FIG. 3)
Figure 3:
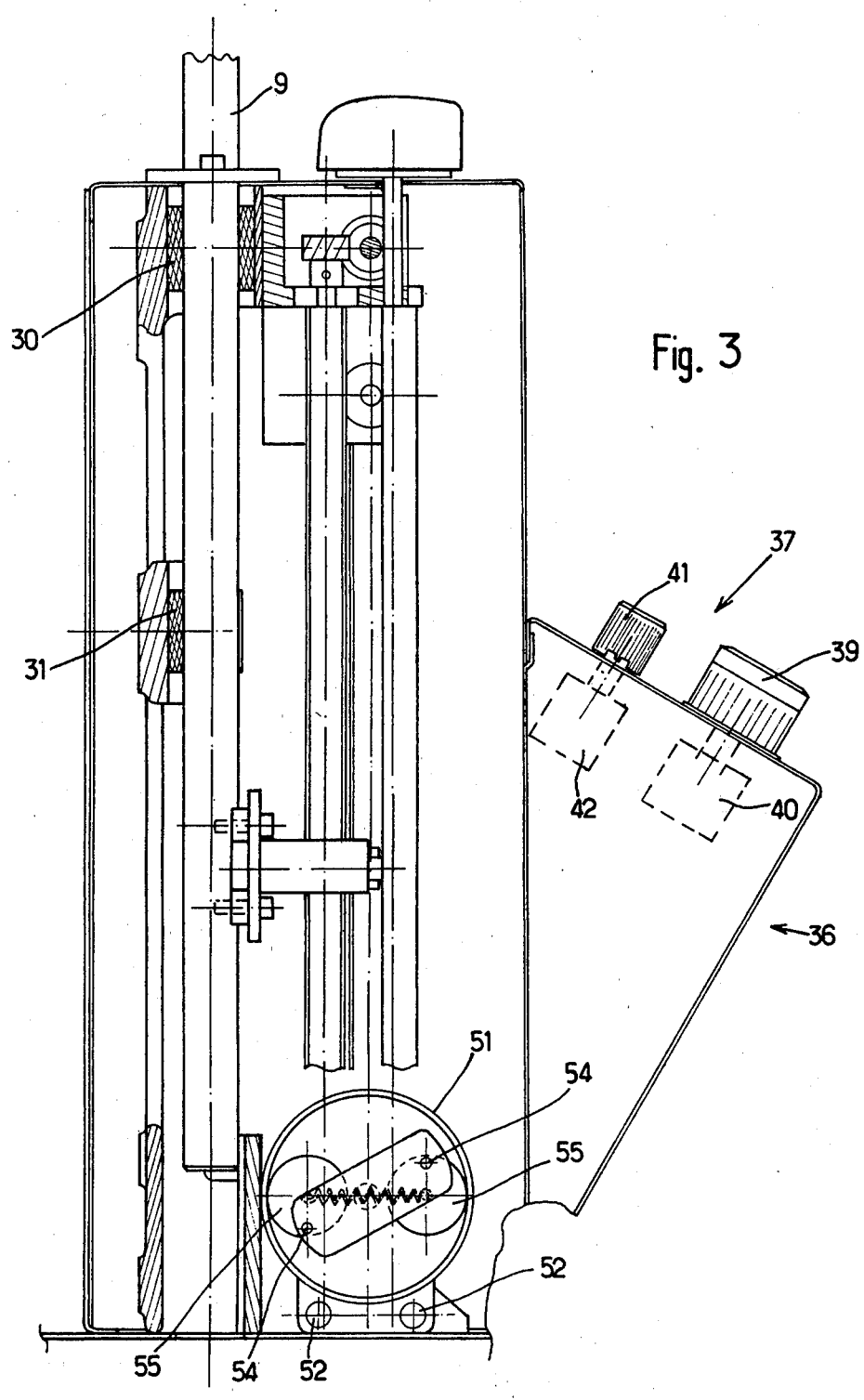

Referring to FIG. 1, the level locating apparatus herein comprises a probe 1 made up by a vertical rod 2 bearing, at its lower end, a level detection blade 3 and which passes, in its upper part, through an opening 4 made in a horizontal cross-bar 5. Fastening of this rod 2 in cross-bar 5 can be accomplished by a knurled head screw 6 being fixed in the cross-bar.

Cross-bar 5 is itself interlocked by means of a similar mounting (opening 7, knurled screw 8) to a vertical column 9 slidably mounted a slide 10 (represented schematically in broken lines) mounted fixedly inside housing 11 of the apparatus.

Near this slide 10 and inside housing 11 is rotatably mounted a vertical threaded rod 12 driven by operating hand-wheel 13 by way of two helical pinions 14 and 15 of which one is integral with threaded rod 12. Rod 12 can also be driven by a remote-controlled motor 16 (represented in broken lines).

Furthermore, on the lower part of column 9, is mounted a releasable nut 17 controlled by a rod 18 actuated by a knob 19.

Under the control of this rod 18, releasable nut 17 can take two positions, namely:

an enlarged position in which it works together with threaded rod 12 so that the rotation of threaded column 12 brings about an axial sliding of column 9; and, a disengaged position in which the threads of nut 17 are free from the threading of threaded rod 12, so that column 9 can slide freely in its slide 10.

The lower end of column 9 is connected, by a connecting member 20, to a notched belt 21 mounted on two running-wheels 22 and 23 with running-wheel 22 driving a potentiometer 24 which consequently furnishes, at every moment, a tension representative of the position of column 9.

FIGS. 2 to 6 illustrate in greater detail another embodiment of a level locating apparatus operating on the same principle as the apparatus represented in FIG. 1.

Therefore, in this device, in a way analagous to the one previously described, an operating hand-wheel 13 controls the rotation of a threaded rod 12 by way of helical pinions 14 and 15. On this threaded rod 12 meshes a releasable nut 17 (FIG. 5) comprising only a fraction of thread 25 and is controlled by means of an offset vertical rod 18 actuated by a knob 19.

Nut 17 is slidably mounted with a spring action return in a housing 26 which is itself integral with vertical column 9 by way of a plate 27, which is locked in rotation by means of a ball bearing 28 working together with a roller-track integral with the body of the apparatus.

On this vertical column 9, which slides between two shaft bearings 30 and 31, is fixed a cross-bar 5 which bears at its other end probe 1 whose position as to height is adjustable by means of knurled head screw 6.

Figure 4:
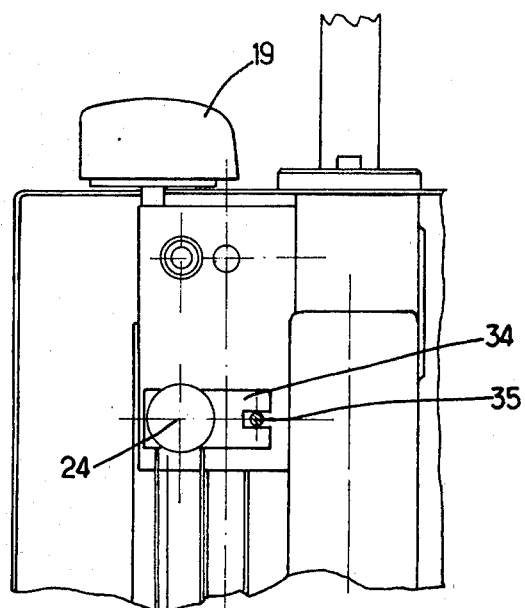
FIG. 4 is a partial vertical cross-section illustrating the installation of the potentiometer.
Figure 5:
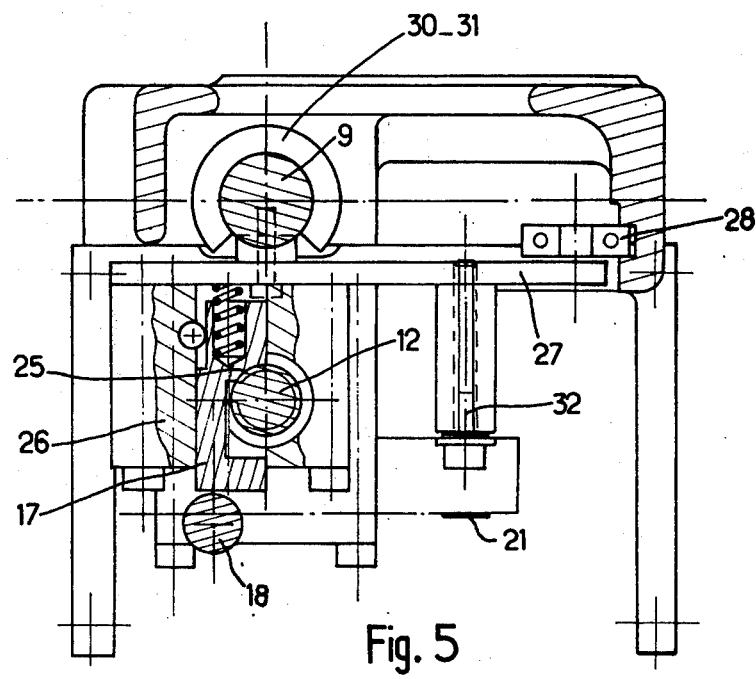
FIG. 5 is a horizontal section along line A—A of FIG. 2.
Figure 6:
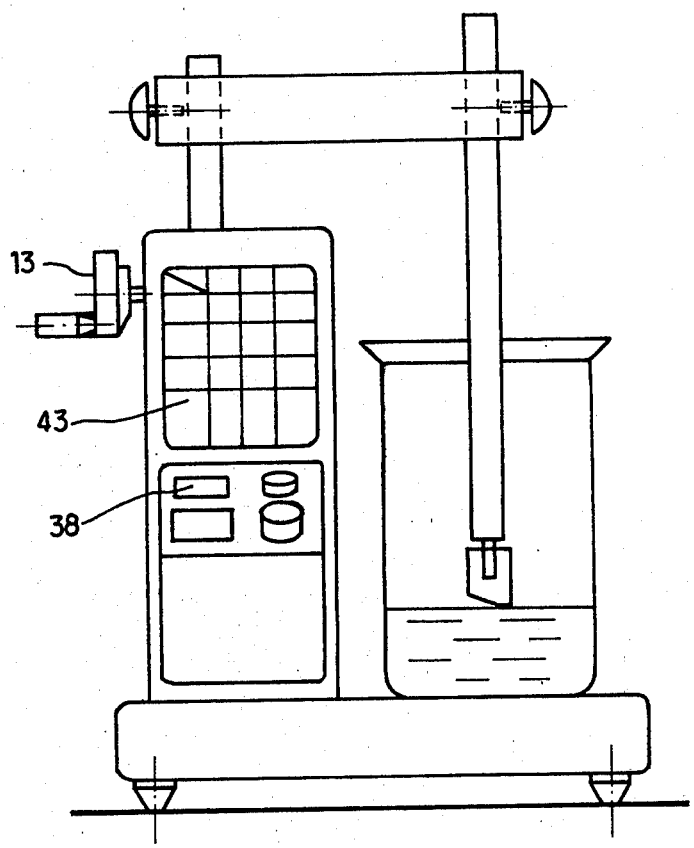
FIG. 6 represents the locating device viewed from the side.

Upon plate 27 there is fixed by a screw 32 (FIG. 5) a notched belt 21 which engages two running wheels 22 and 23 which turn freely in ball bearings. Inside running wheel 22, there is provided a bore hole receiving the end of shaft 24' of potentiometer 24, the shaft being immobilized by a screw 33. The body of potentiometer 24 is locked in rotation by a small plate 34 itself prevented from turning by a catch 35 (FIG. 4).

It will be noted that by this arrangement, potentiometer 24 undergoes no stress which can be created by a bad alignment of shaft 24' since it is suspended on a shaft 24' and only kept in rotation.

Furthermore, from the fact that potentiometer 24 cannot accept a high speed of rotation (greater than 300 revolutions per minute), which would be the case if nut 17 is disengaged when the moving contact is in the elevated position, due to the uniformly accelerated motion of descent owing to the weight of this contact, a speed-limiting device has been provided.

This speed-limiting device is composed of a cylindrical drum 51 integral with the frame by two screws 52 and concentric with the axis of lower running-wheel 23.

On this running-wheel 23 is fixed a cylindrical member 53 furnished with two shafts 54 which hold two fly-weights 55 whose weight is calculated in such a manner that during descent, centrifugal force causes them to be forcefully applied on the inside face of drum 51 causing a normal stress and consequently a friction reaction opposing the motion and, at any rate, limiting vertically the maximum speed of descent of the moveable parts.

A release spring keeps the two fly-weights away from the drum when the apparatus is used as a measuring device, in order to avoid static friction.

The previously described level locating device includes, moreover, a control-box 36 in which is housed the entire electronic unit and, particularly, a device to divide into equal parts a segment of variable length of the type described in commonly assigned FR patent application No. 77 39 839 of December 1977. Front face 37 of this control-box 36 comprises luminous indicators 38 (FIG. 6) giving the numeration in mixture parts, a counter knob 39 controlling potentiometer 40 provided with amplification adjustment, for example, in order that it may display 1000 divisions per 10 revolutions of the potentiometer, and a knob 41 which carries out the control of a potentiometer 42 being used to reset it to zero at the end of stroke. This front face includes, moreover, a photengraved plate 43 comprising a signal board with two inputs giving the number of gradations of the amplification potentiometer for the different mixtures to be prepared, and this, as a function of the diameter of the dosage vessel.

Therefore, in order to carry out a dosage, the operator who has to prepare a certain quantity of products, selects from photoengraved plate 43, with respect to the quantity to be prepared, the diameter of the most suitable vessel as well as the setting indication corresponding to amplification potentiometer 40.

Next, the operator places the vessel on the apparatus, raises probe 1 to an adequate extent and relocks the latter temporarily with knurled knob 6. Then, in actuating release knob 19, he lets the assembly of cross-bar 5 and column 9 redescend up to its low stroke end. Counter 38 is then adjusted to zero by means of potentiometer 42, and finally, in unlocking knurled knob 6, probe 1 and blade 3 are allowed to descend to the bottom of the veseel. The apparatus is therefore set to the zero position. The operator then need only manipulate handwheel 13 up to the indication corresponding to the first product quantity to be mixed which appears on luminous indicators 38.

The operator pours then, with the proper precautions, the liquid in the vessel until he observes a flash on the tip of blade 3, and next, pours very gently until mark 48 engraved on this blade is reached.

Next the operator proceeds to the setting of the second quantity, and so on, up to the division 1000, or more, according to the settings of the apparatus.

As previously mentioned, the level detector set at the lower end of the probe can consist of a blade making it possible to indicate to the operator:

(a) that he is approaching the final level,
(b) that he has reached the final level.

Figure 7:
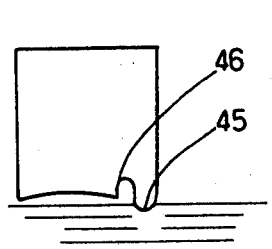
FIGS. 7 and 8 represent two types of blade detectors presently used on the market.
Figure 8:
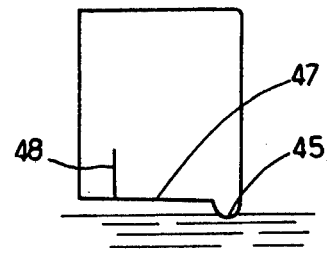

To achieve this result, the blade includes a protuberance 45 providing a capillary pre-flash which is very visible to the naked eye, and, a few millimeters higher, a conformation 46 making it possible to obtain a second capillary flash (FIG. 7), or through a progressive rise 47, up to an engraved mark 48 (FIG. 8).

Figure 9:
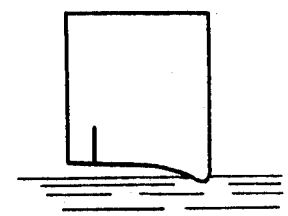
FIG. 9 represents an improved blade detector according to the invention.

The invention proposes in view of increasing the accuracy of this detection, an improvement consisting in obtaining a variable and progressive sensitivity from the moment when protuberance 45 has caused a pre-flash, up to the moment when it reaches the final level (FIG. 9).

Figure 10:
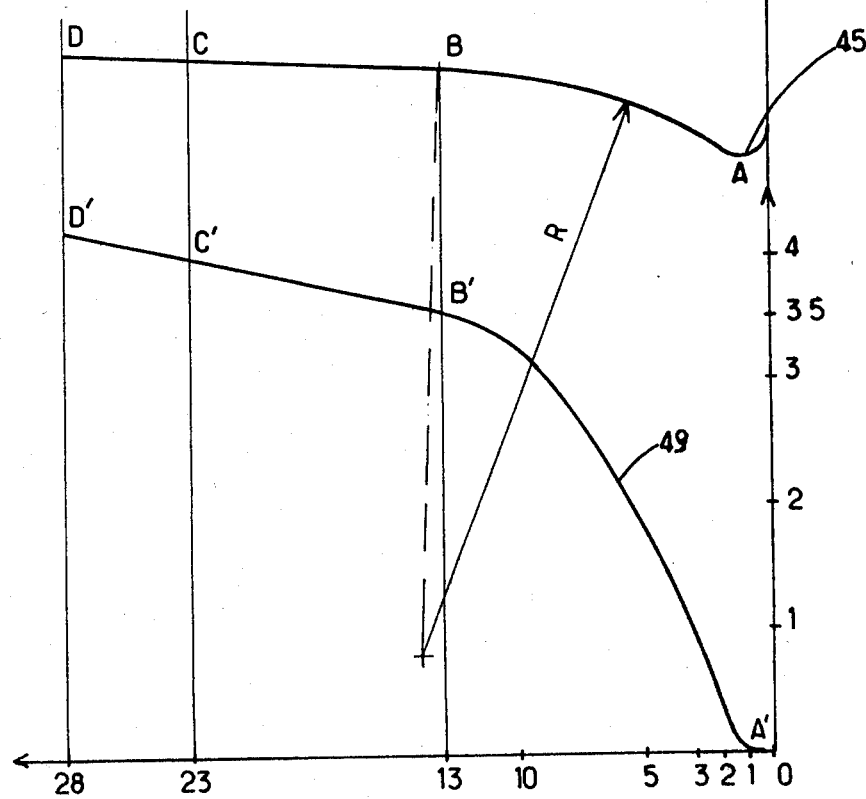
FIG. 10 is an illustration on a larger scale representing the blade detector's profile shown in FIG. 9 with its curve of sensitivity below.

To achieve this result, the blade comprises, in its lower edge adjacent to the protuberance, a circular portion AB with radius R and center X followed by an inclined straight line BDC in relation to the horizontal, straight line XB being perpendicular to segment BD (FIG. 10).

By way of an example, it is observed that in the drawing shown in FIG. 10 at scale 5, in the first part of the blade, the sensitivity (curve 49) corresponds to about 2.4 mm of horizontal displacement from the point of contact for each millimeter of liquid level elevation (parts A'B' of the sensitivity curve).

On the other hand, in B', C', D', it is observed that a liquid elevation of 0.1 mm corresponds to a horizontal displacement of 2.5 mm from the point of contact, or 10 times more than previously.

It follows from this that with a moderately trained operator, a level difference of a tenth of a millimeter and also a level movement can very easily be obtained when the point of contact is located in the CD part of the blade.

We claim:

1. Level locating apparatus which comprises:
   a probe having a level detector at its lower end which is provided with a means for adjusting the height of said probe, mounted upon a support element integral with a vertical column sliding axially in a slide fixed in the body of said apparatus;
   a vertical threaded rod rotatably mounted on said body near said column and capable of being driven in rotation by means of a manually controllable drive mechanism;
   a releasable nut axially integral with said column and which, by the action of a control device, can take two positions, namely:
   an engaged position in which the threads of the nut work together with the threading of a threaded rod so as to achieve an axial movement of the column when the threaded rod is rotated;
   a disengaged position in which the threads of the nut are away from the threading of the threaded rod, this disengaged position permitting free sliding of the column in its slide; and,
   a driving apparatus assuring the control of a potentiometer as a function of the position of said column.

2. Apparatus according to claim 1, wherein said driving-apparatus comprises a positive acting mechanical system such as a notched belt or endless chain extending parallel to said column and mounted on two running-wheels of which one drives a potentiometer with said belt or said chain being driven by said column by means of a connecting member.

3. Apparatus according to claim 2 wherein one of the two running-wheels comprises a bore-hole in which the end of a shaft of the potentiometer fits and is fixed, and wherein the body of the potentiometer is locked in rotation by a small plate, itself prevented from turning by a catch.

4. An apparatus according to claim 2 wherein the positive acting mechanical system comprises two running wheels which engage the notched belt or extending chain.

5. An apparatus according to claim 4 comprising a speed-limiting device mounted on the one running wheel.

6. Apparatus according to claim 5 wherein said speed-limiting device comprises, a cylindrical drum fixed on the frame, concentric to the shaft of the one running wheel, wherein upon said coupling-sleeve is fixed a cylindrical member furnished with two shafts which hold two fly-weights drawn back by a spring and which, in turning, are firmly applied on the inside face of the drum by the action of centrifugal force.

7. Apparatus according to claim 1 wherein the nut is slidably mounted with spring return in a housing which is integral with the vertical column by way of a plate which is locked in rotation by means of a ball bearing working together with a roller-track integral with the body of the apparatus.

8. Apparatus according to claim 1 wherein the level detector further comprises a blade having on its lower edge a protuberance of such configuration as to cause, when it returns into contact with the liquid, a capillary pre-flash, and an inclined section bearing a mark indicating the moment when the liquid reaches the final level.

9. An apparatus according to claim 8 wherein the blade's lower edge, adjacent to the protuberance comprises, a circular portion AB with radius R defined by center X, adjacent to a straight line portion BCD which form a perpendicular with line XB inclined in relation to the horizontal with B as the vertex.

10. An apparatus according to claim 1 wherein said means of adjusting the probe comprises a knurled head screw which joins the upper end of the probe to the support element.

* * * * *